(12) United States Patent
Baker (10) Patent No.: US 7,130,190 B1
(45) Date of Patent: Oct. 31, 2006

(54) COMPUTER SERVICING CART

(75) Inventor: William Baker, Indianapolis, IN (US)

(73) Assignee: Span, Inc., Indianapolis, IN (US)

( * ) Notice: Subject to any disclaimer, the term of this patent is extended or adjusted under 35 U.S.C. 154(b) by 234 days.

(21) Appl. No.: 10/716,094

(22) Filed: Nov. 18, 2003

Related U.S. Application Data (60) Provisional application No. 60/484,176, filed on Jun. 30, 2003, provisional application No. 60/427,463, filed on Nov. 18, 2002.

(51) Int. Cl.
*G06F 1/16* (2006.01)

(52) U.S. Cl. ............... 361/695; 361/683; 320/107; 320/111; 280/47.35

(58) Field of Classification Search ........ 361/679–687, 361/721–727; 312/223.1–223.3; 280/47.35, 280/79.3, 79.2, 652; 318/139, 280; 320/105, 320/107, 111, 116; 180/19 R, 23; 307/43, 307/80, 85
See application file for complete search history.

(56) References Cited

U.S. PATENT DOCUMENTS

| | | | |
|---|---|---|---|
| 4,669,790 A | 6/1987 | Briggs | |
| 4,989,291 A | 2/1991 | Parent | |
| 5,113,546 A | 5/1992 | Parent | |
| 5,460,441 A | 10/1995 | Hastings et al. | |
| 5,505,473 A | 4/1996 | Radcliffe | |
| 5,697,686 A | 12/1997 | Miller et al. | |
| 6,008,621 A * | 12/1999 | Madison et al. | 320/107 |
| 6,016,252 A | 1/2000 | Pignolet et al. | |
| 6,078,503 A | 6/2000 | Gallagher et al. | |
| 6,188,973 B1 | 2/2001 | Martinez et al. | |
| 6,218,796 B1 * | 4/2001 | Kozlowski | 318/280 |
| 6,301,106 B1 | 10/2001 | Helot et al. | |
| 6,462,944 B1 | 10/2002 | Lin | |
| 6,493,217 B1 * | 12/2002 | Jenkins, Jr. | 361/683 |
| 6,545,863 B1 * | 4/2003 | Huggins | 361/683 |
| 6,583,989 B1 | 6/2003 | Guyer et al. | |
| 6,589,308 B1 | 7/2003 | Gianelo | |
| 6,621,713 B1 | 9/2003 | Amaike et al. | |
| 2003/0028588 A1 * | 2/2003 | McConnell et al. | 709/203 |
| 2003/0111245 A1 * | 6/2003 | Haggerty | 174/50 |
| 2003/0141687 A1 * | 7/2003 | Wixted et al. | 280/47.35 |
| 2003/0184035 A1 * | 10/2003 | Yu | 280/47.35 |
| 2004/0139571 A1 * | 7/2004 | Chang et al. | 15/315 |
| 2005/0110461 A1 * | 5/2005 | McConnell et al. | 320/116 |
| 2005/0158616 A1 * | 7/2005 | Heatley | 429/90 |

FOREIGN PATENT DOCUMENTS

WO WO 97/49161 * 12/1997

* cited by examiner

*Primary Examiner*—Michael Datskovskiy
(74) *Attorney, Agent, or Firm*—Cardinal Law Group (57) ABSTRACT

A computer servicing cart containing one or more battery servicing compartments or modules for charging and storing batteries for electronic devices, such as computers, cellular phones, and PDAs. One or more computer servicing compartments or modules for charging and storing electronic devices, such as computers, cellular phones, and PDAs. One or more internal power supplies selectively connectable to at external electrical outlet. A power shedding control circuit to prevent the cart from overloading an external outlet.

18 Claims, 8 Drawing Sheets

Fig. 11

COMPUTER SERVICING CART

CROSS-REFERENCE

This application claims priority from U.S. Provisional Patent Application Ser. No. 60/484,176, filed on Jun. 30, 2003, and U.S. Provisional Patent Application Ser. No. 60/427,463, filed on Nov. 18, 2002.

BACKGROUND

The present invention relates generally to battery charging hardware, and more particularly to a computer servicing cart for use with computers or other battery-driven devices.

Various computers and other battery driven devices are widely used today. Due to the various configurations of internal and external components, the connections to power supplies and batteries can be cumbersome. End-to-end wiring and loose external pieces may be involved and make the connections unsightly and difficult to manage.

DETAILED DESCRIPTION

The present invention relates generally to battery charging hardware, and more particularly to a computer servicing cart for use with computers or other battery-driven devices. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not, in itself, dictate a relationship between the various embodiments and/or configurations discussed.

Figure 1:
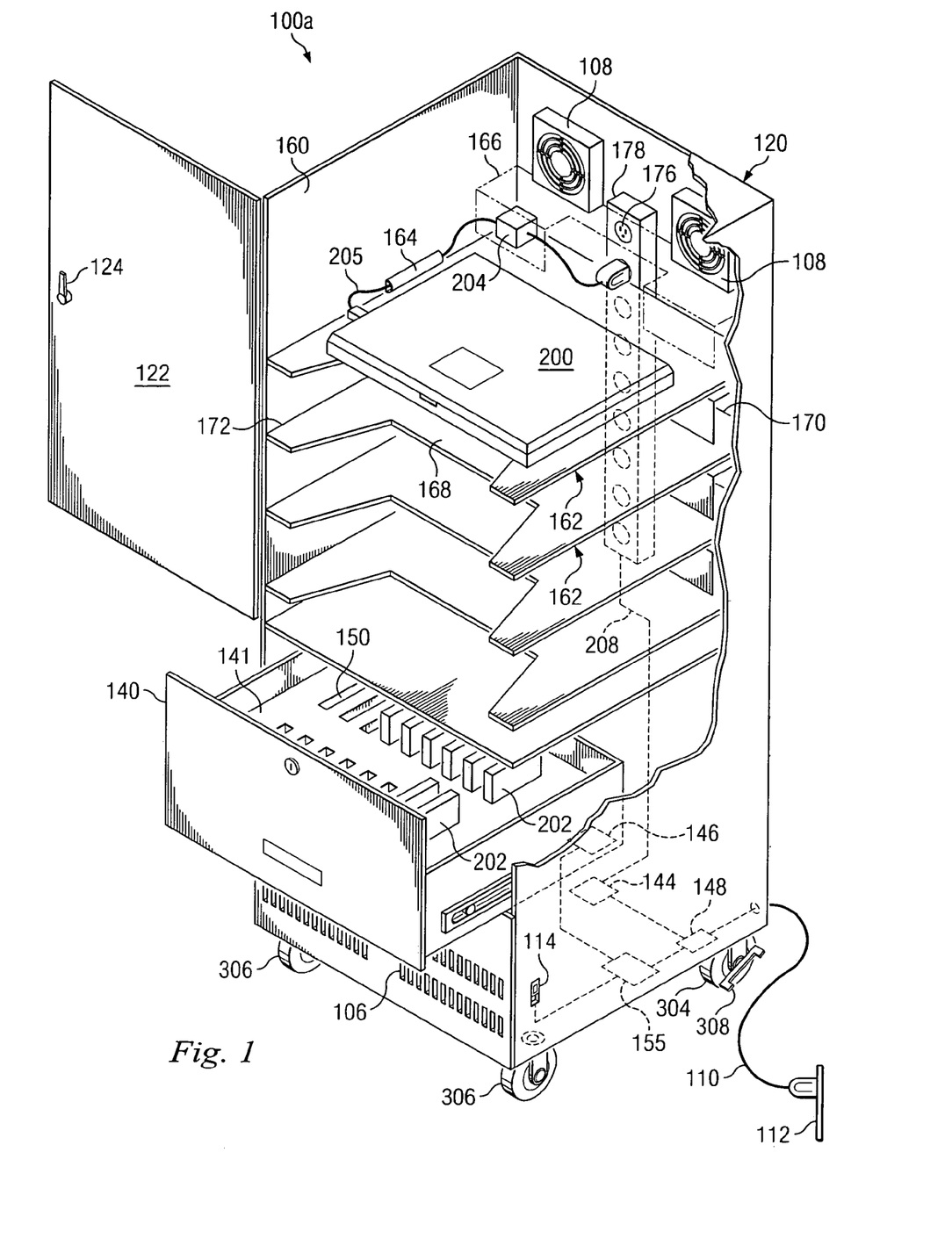
FIG. 1 is a cutaway perspective view of one embodiment of the present disclosure.

FIG. 1 is a cutaway perspective view of one embodiment of a computer servicing cart 100a, showing one possible internal configuration. The computer servicing cart 100a comprises an outer cabinet 120, which comprises a battery servicing compartment 140 and a computer storage compartment 160. In some embodiments, the cart 100a will also comprise other compartments and storage areas. The cart 100a may comprise a cooling system, which, in one embodiment, includes open vents 106 in the outer cabinet 120. In another embodiment, the cooling system includes a series of fans 108 disposed in the outer cabinet 120. In yet another embodiment, the cooling system includes a forced air system, which may make use of both fans 108 and vents 106. In one embodiment, the cart 100a may have wheels 304, 306. One or more of the wheels 306 may be rotatably attached to the cabinet 120, while some wheels 304 may be attached in a fixed direction. One or more wheels 304 may also be equipped with a brake 308.

The computer storage compartment 160 may have a door 122 and a lock 124. The computer storage compartment 160 may contain one or more shelves 162, which may be adjustable. In one embodiment, the shelves 162 have a front end 172 situated higher in the compartment 160 than a back end 170, to facilitate secure storage of one or more computers 200. The computer 200 may be a personal laptop computer, a cell phone, a PDA, or other portable electronic device. In one embodiment, the shelf 162 has a recessed portion 168 on the front end 172 to facilitate insertion and removal of the computer 200.

Each shelf 162 may have a compartment or cover 166, which may be near the back 170, to conceal or store an AC/DC adapter 204. The adapter 204 may be usable with the computer 200. In one embodiment, a retainer 164 is provided near the shelf 162. The retainer 164 may be adapted for guiding a cable 205 from the AC/DC adapter 204 to the computer 200. The retainer 164 may be a clip, a clamp, a hook-and-loop closure, a plastic or metal conduit, or any other device suitable to retain the cable 205 in a relatively fixed position.

In one embodiment, the shelves 162 are configured to adjust such that each stop may be near an outlet 176. The outlets 176 may be a part of a grid or strip of outlets 178. The outlets 176 may be standard U.S. electrical outlets, European outlets, or other types of electrical connections. The outlets 176 and grid 178 may be powered by a power cord 110 which may connect to an external electrical outlet 112. The outlet 112 may be a standard US outlet, a European outlet, or any outlet adaptable to fulfill the needs of the cart 100a.

The battery servicing compartment 140 may comprise a drawer or a smaller cabinet within the outer cabinet 120. The compartment 140 may have a battery storage system 141 adapted to store one or more batteries 202. The batteries 202 may be held in place by receptacles 150 adapted to store a specific battery type. The receptacles 150 may be adjustable, or removable, to store a variety of different battery types. In another embodiment, the entire storage system 141 may be removable to facilitate different battery types.

A charging system 146 may be configured to charge the batteries 202 when they are stored in the receptacles 150. The charging system 146 may also be adaptable, or replaceable, to charge a variety of different battery types. In one embodiment, the charging system 146 is integrated with the storage system 141. In another embodiment, the charging system 146 is a separate component that may be stored in the battery servicing compartment 140 or elsewhere in the cabinet 120. In yet another embodiment, the battery servicing compartment 140 is a removable drawer integrating both the charging system 146 and storage system 141.

A power supply 155, disposed in the outer cabinet 120, may power the charging system 146. The power supply 155 may be any power supply capable of supplying the battery charging system 146 with the correct current and/or voltage. The power supply 155 connects to the external outlet 112 by a power cord 110. The power supply 155 may be activated by a manual switch 114. In other embodiments, the power supply 155 may be activated wirelessly, by connecting the power cord 110 to the outlet 112, by connecting a battery 202 for charging, or other suitable means.

In one embodiment, the cart 100a is equipped with a power shedding circuit 144, which may prevent overloading of the external outlet 112. As will be explained in greater detail below, the power shedding circuit 144 may monitor the current drawn on the external outlet 112 via a current sensing device 148. If the current exceeds a predefined limit, the power shedding circuit 144 may shut off power to the computer storage compartment 160. In one embodiment, the power shedding circuit 144 retains the value, or estimated value, of the current drawn at the time it exceeded the predefined limit. The circuit 144 may then restore power to the computer storage compartment 160 when the current drawn by the power supply 155 drops enough to allow restoring power without exceeding the predefined limit.

Figure 2:
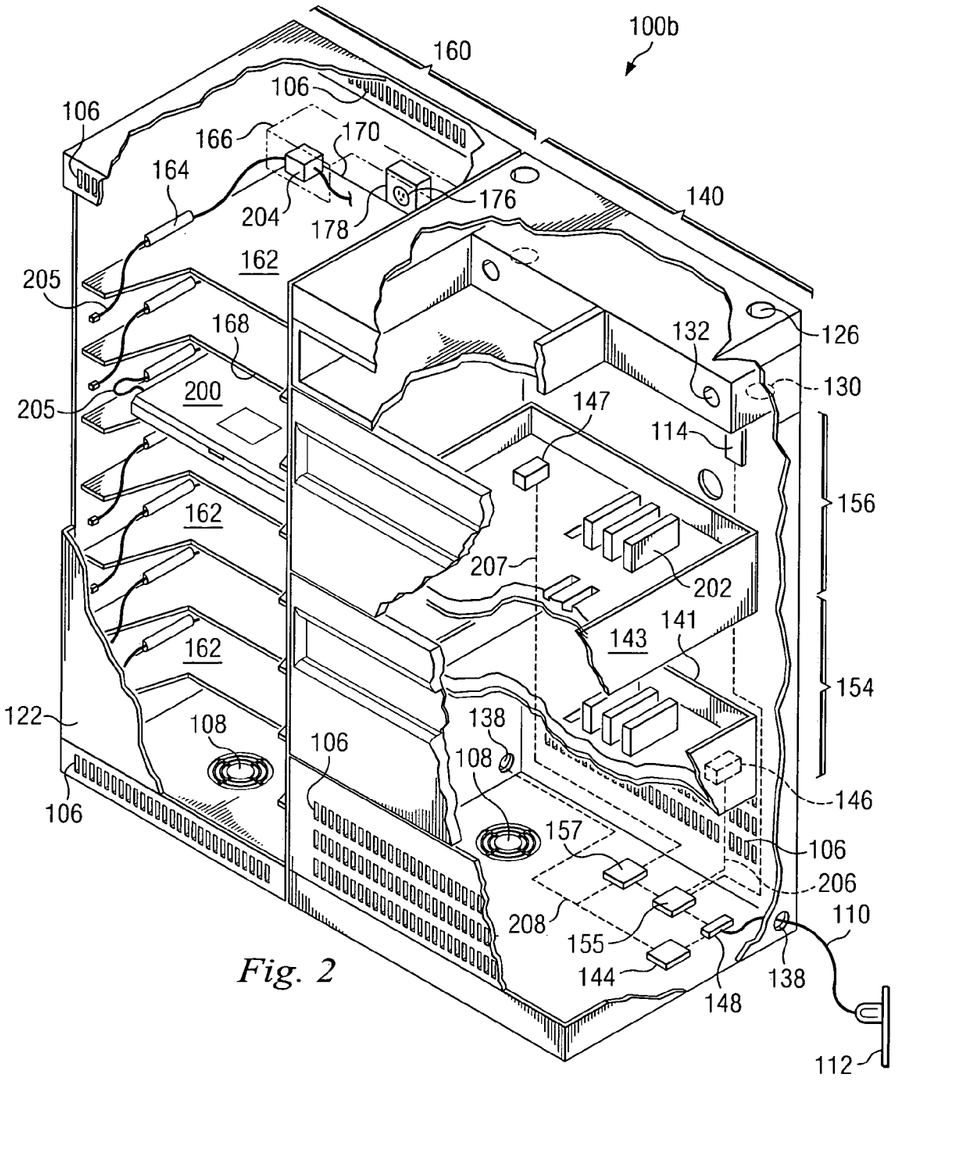
FIG. 2 is a cutaway perspective view of a second embodiment of the present disclosure.

Referring to FIG. 2, in another embodiment, the cart, herein designated with reference numeral 100b, may have a modular design. The one or more computers 200 may be stored in a computer storage module 160. The computer storage module 160 may comprise all of the features of the computer storage compartment of a non-modular embodiment (FIG. 1). For example, the computer storage module 160 may have shelves 162 that may have a back end 170 disposed lower than a front end 172. There may be a recessed portion 168 near the front end 172. There may be an AC/DC adapter 204 storage compartment 166 near the back end 170 of each shelf 162. A retainer 164 may also be provided to guide the cord 205 from the AC/DC adapter 204 to the computer 200. There may be an electrical outlet 176 disposed near the AC/DC storage compartment 166, and the outlet may be a part of a power strip 178.

In one embodiment, a cooling system may be provided in the computer storage module 160. The cooling system may include a series of vents 106, fans 108, or both. Power to the computer storage module 160 may come from the battery servicing module 140, for example, via a cable 208 passing through a port 138. The computer storage module 160 may be attached to the battery servicing module 140 by a permanent fixation (e.g. welding), or it may be removably attached (e.g. by bolts or clamps).

The battery servicing module 140 may contain one or more battery servicing compartments 154, 156. The battery servicing module 140 may also comprise all of the features of the battery servicing compartment of a non-modular embodiment (FIG. 1). For example, the battery servicing module 140 may contain a first power supply 155 supplying power by cable 206 to a battery charging system 146. A second power supply 157 may supply power to a second charging system 147 by cable 207. The charging systems 146, 147 may be configured to charge batteries being stored in battery storage systems 141 and 143, respectively. The charging systems 146, 147 may be disposed in battery servicing compartments 154, 156, respectively. In other embodiments, charging systems 146, 147 may be disposed elsewhere in the battery servicing module 140.

Figure 7:
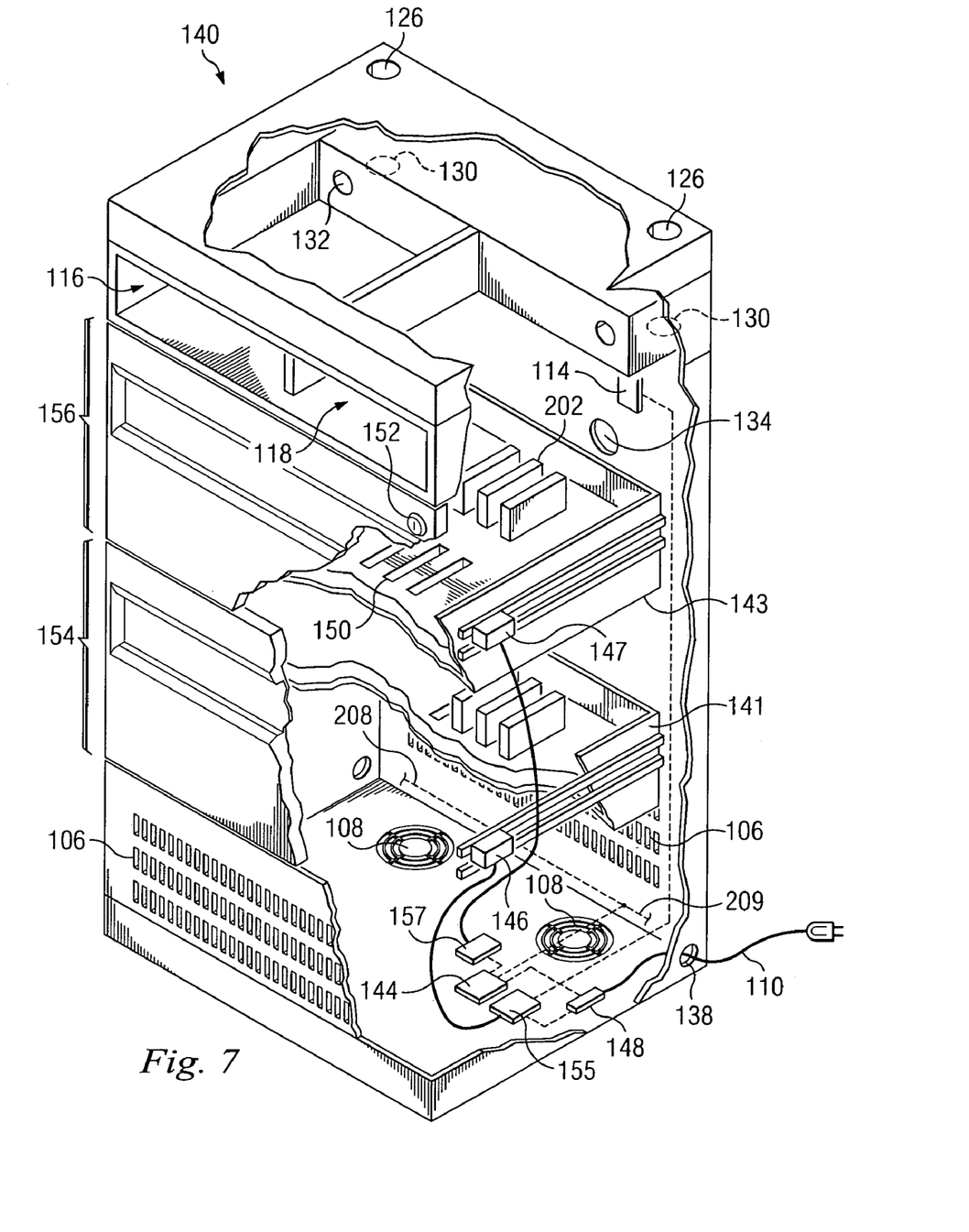
FIG. 7 is a cutaway perspective view of a battery servicing module.

The battery storage systems 141, 143 may be adaptable, or removable, to store a variety of battery types. Similarly, charging systems 146, 147 may be adaptable or removable to charge a variety of battery types. In one embodiment, the charging systems 146, 147 are integrated with battery storage systems 141, 143, such that the charging systems and battery storage systems may be replaced as one unit. In another embodiment, the entire battery servicing compartments 154, 156 are integrated with storage systems 141, 143 and charging systems 146, 147, respectively, such that the entire compartments 154, 156 can be exchanged to facilitate different battery types. In FIG. 7, the compartments 154, 156 are illustrated as drawers but other configurations that are suitable for containing or integrating the storage systems 141, 143 and/or charging systems 146, 147 are possible The battery servicing module 140 may also utilize a cooling system, which may comprise vents 106, fans 108, or both. The battery servicing module 140 may be connected to an external outlet 112 by a power cord 110. The outlet 112 may be a standard US outlet, a European outlet, or any other outlet adaptable to fulfill the needs of the power supplies 155, 157, and computer storage module 160. The power supply 155 may be activated by a manual switch 114. In other embodiments, the power supply 155 may be activated wirelessly, by connecting the power cord 110 to the outlet 112, by connecting a battery 202 for charging, or any other suitable means.

In one embodiment, the cart 100b is equipped with a power shedding circuit 144, which may prevent overloading of the external outlet 112. As will be explained in greater detail below, the power shedding circuit 144 may monitor the current drawn on the external outlet 112 via a current sensing device 148. When the first power supply 155 is powered on, the power shedding circuit may begin monitoring the current drawn on the outlet 112. If the current stays below a predefined limit, the second power supply 157 and the computer storage module 160 may be powered on. The devices (e.g. the second power supply 157 and computer storage module 160) may be activated according to a predefined order, which may be stored in the power shedding circuit 144.

If the current drawn from outlet 112, after activating a device, is over the predefined limit, the device may be powered off. The power shedding circuit 144 may store the value, or estimated value, of the current drawn by one or more of the devices when the current exceeded the predefined limit. The circuit 144 may power on one or more powered-off devices when the current drawn on the outlet 112 has fallen enough to allow powering back on without exceeding the predefined current limit.

Figure 3:
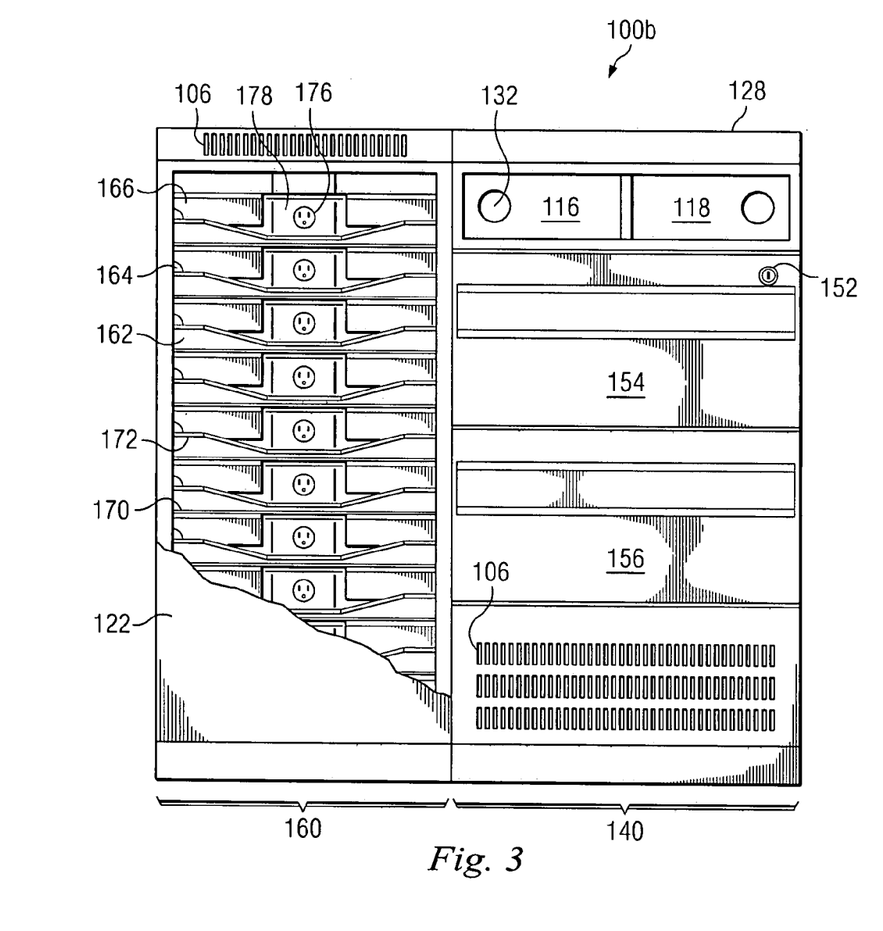
FIG. 3 is a frontal view of the embodiment of FIG. 2.

Referring now to FIG. 3, a frontal view of one embodiment of a modular design of the cart 100b is illustrated. In this embodiment vents 106 comprise the cooling system. The AC/DC adapter cover 166 is shown at the back end 170 of the shelves 162. The retainer 164 is shown to the left side of the shelves 162. In this embodiment, the computer storage module 160 is shown attached to the left of the battery servicing module 140, but other configurations are possible.

Figure 4:
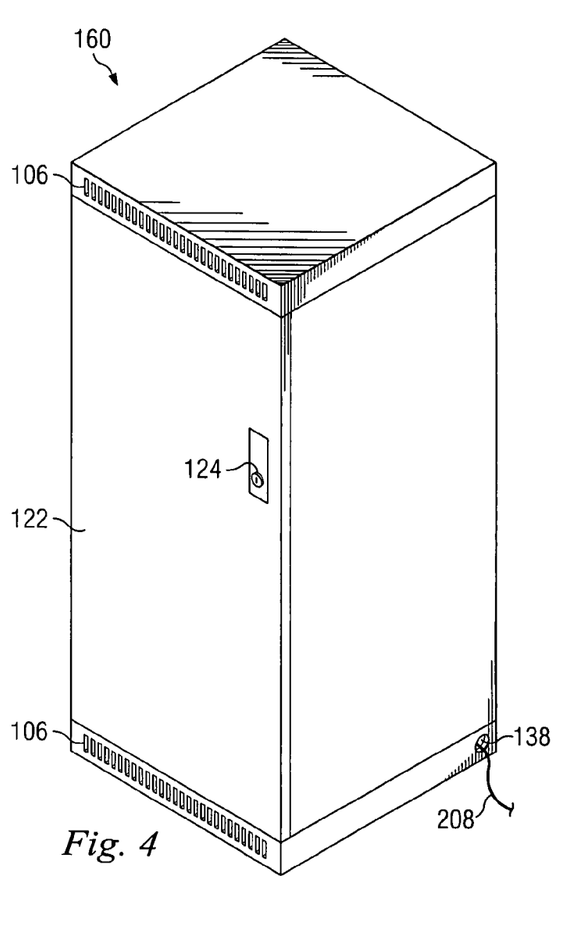
FIG. 4 is a perspective view of a computer storage module.
Figure 5:
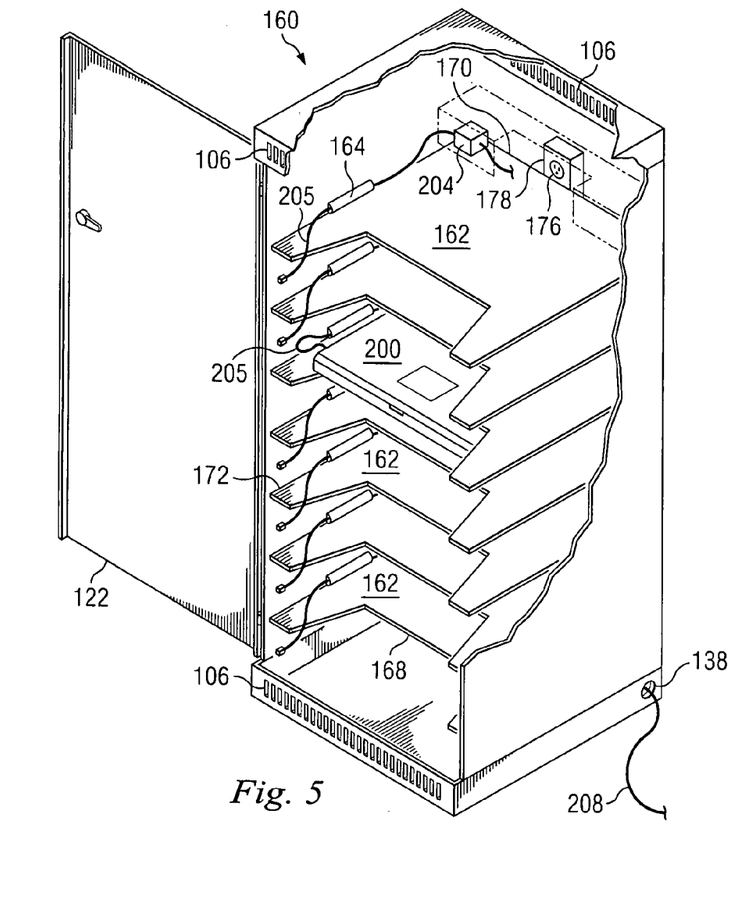
FIG. 5 is a cutaway perspective view of a computer storage module.

FIG. 4 is a perspective view of the computer storage module 160, detached from the cart 100b. In this embodiment, the module 160 has a door 122 with a lock 124. Cooling may be provided by vents 106. Power may be supplied by the battery servicing module 140 via the power cord 208 passing through port 138. FIG. 5 is a cutaway view illustrating one possible internal configuration of FIG. 4. Here, the retainer 164 is a plastic conduit through which the AC/DC cable 205 may pass. A plurality of shelves 162 may each be near an outlet 176, but in some embodiments there may be fewer shelves and the shelves may be adjustable.

Figure 6:
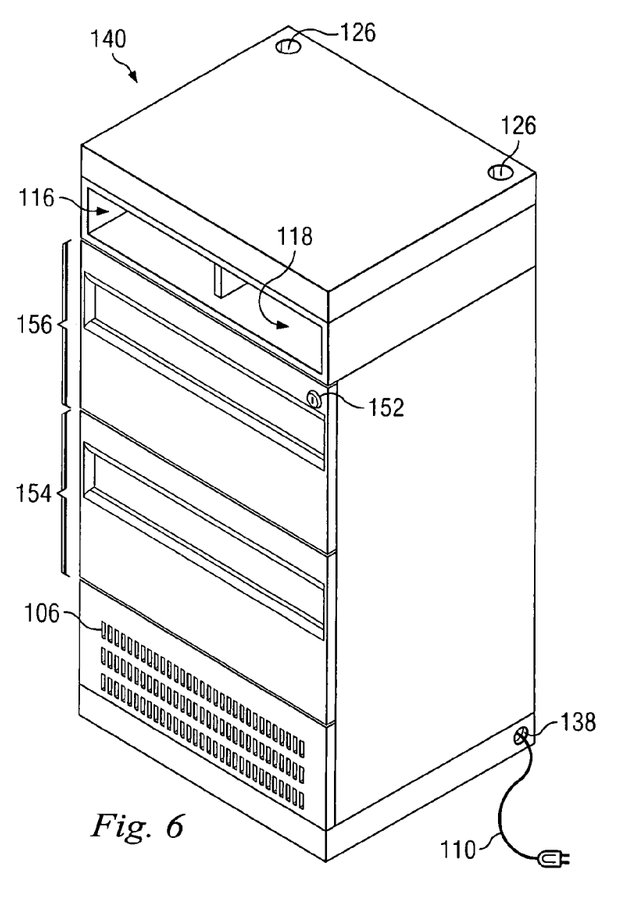
FIG. 6 is perspective view of a battery servicing module.

FIG. 6 is a perspective view of the battery servicing module 140, detached from the cart 100b. In this embodiment, there are two battery servicing compartments 154, 156, one or both of which may be lockable by a lock 152. Extra storage space may be provided by compartments 116 and 118. FIG. 7 is a cutaway view of FIG. 6. In this embodiment the cooling system comprises fans 108 and vents 106. The battery charging systems 146, 147 may be attached to the battery servicing compartments 154, 156 in the locations shown, but other embodiments may have alternative placements. Ports 138 are illustrated along with power lines 208, 209 for powering a plurality of computer storage modules 160. In FIG. 7, wiring 208, 208 for up to two computer storage modules 160 is shown, but other configurations are possible.

Figures 8, 9:
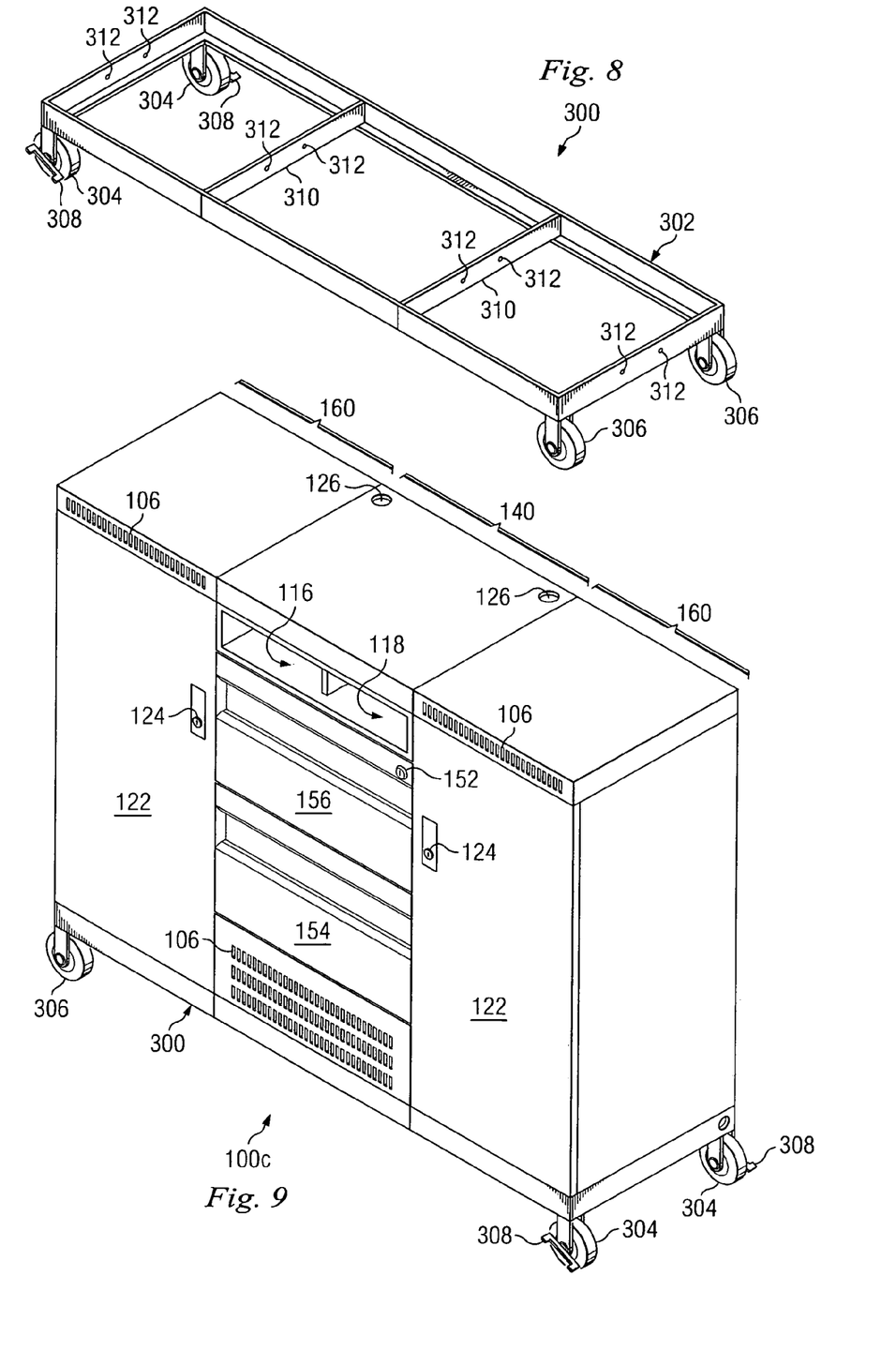
FIG. 8 is a perspective view of a wheeled transport module
FIG. 9 is a perspective view another embodiment of the present disclosure.

Referring to FIG. 8, a wheeled transport module 300 may be attached to the cart 100b. The module 300 may comprise a frame 302 which may be a metal, steel, or wooden frame, or made of any material suitable for supporting one or more battery servicing modules 140 and computer storage modules 160. Cross members 310, of a same or different material as the frame 302, may also be used. The wheeled module 300 may have a plurality of wheels 304, 306 which may be attached in a fixed direction 304 or attached rotatably 306. One or more wheels may have a brake 308. The transport module 300 may be attached to the cart 100b permanently (e.g. by welding) or removably (e.g. by bolts or clamps). In one embodiment, bolt holes 312 are used to bolt one or more battery servicing modules 140 and/or one or more computer storage modules 160 to the wheeled transport module 300.

FIG. 9 illustrates one possible embodiment of a modular cart, herein designated with reference numeral 100c. A single computer servicing module 140 may have a computer storage module 160 attached on both sides. The battery servicing module 140 and computer storage modules 160 may be attached to a wheeled transport module 300, having two wheels attached in fixed direction 304, each with a brake 308, and two wheels attached rotatably 306. FIG. 9 is meant for illustration only as many other embodiments and combinations of the modules are possible.

Figure 10:
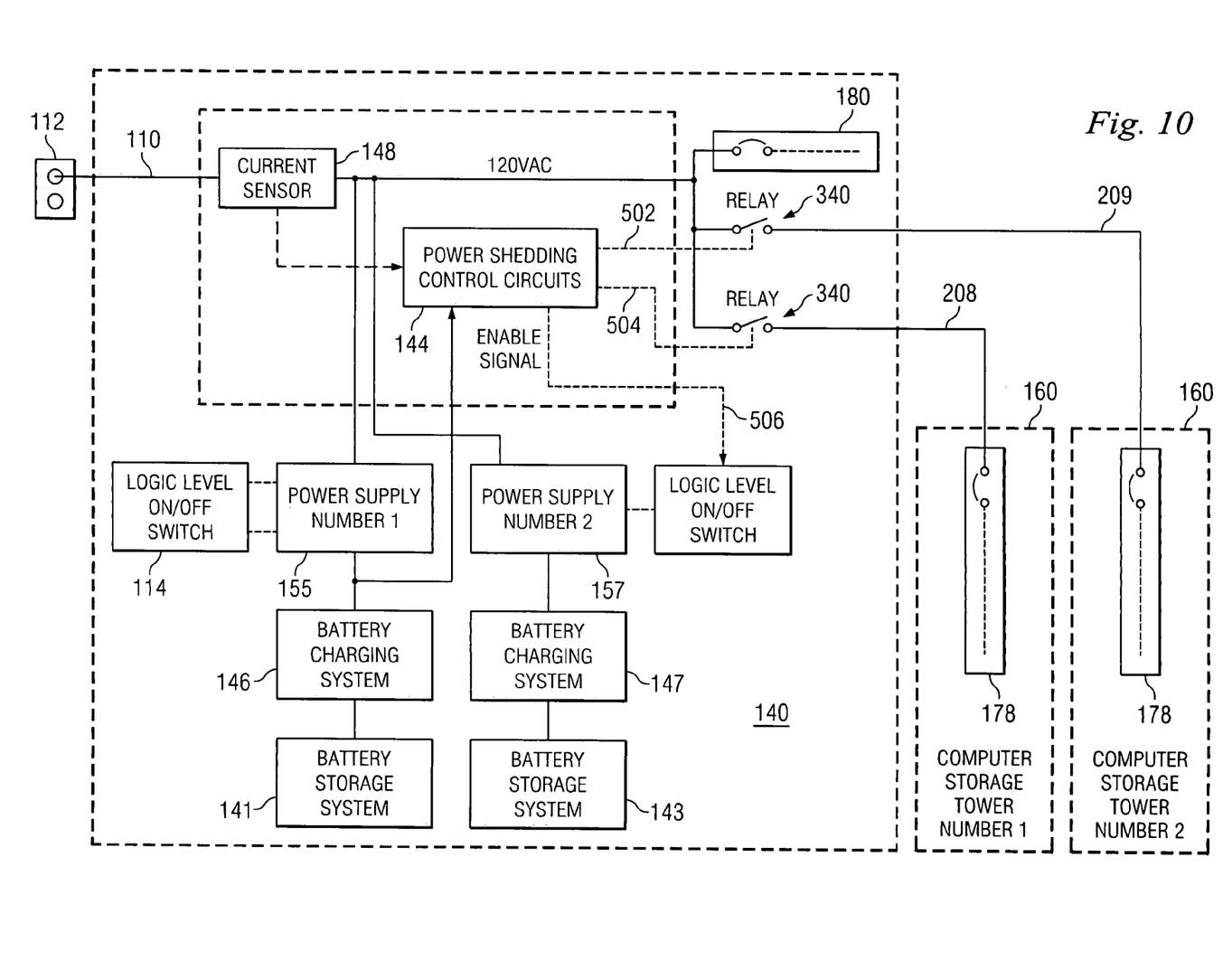
FIG. 10 is a power distribution diagram corresponding to one embodiment of the present disclosure.

FIG. 10 illustrates a power distribution diagram for one possible embodiment of a power shedding circuit 144. The current sensing device 148 may be attached to the cord 110 coming from the external outlet 112. The current sensor 148 may relay a signal voltage, representing the current drawn from the outlet 112, to the power shedding circuit 144. The first power supply 155, which may be controlled by the logic switch 114, may draw current from line 110 downstream of the current sensor 148 such that the current drawn by the power supply may be read. The first power supply 155 may supply power to the battery charging system 146 for battery storage system 141. The first power supply 155 may also power the power shedding circuit 144 such that the circuit may be activated by the first power supply.

The power shedding circuit 144 may activate the second power supply 157 by sending an enable signal on a logical output 506. The second power supply 157 may supply power to the battery charging system 147 for the battery storage system 143. The power shedding circuit 144 may control power to computer storage modules 160 via relays 340 attached to logical outputs 502, 504. In some embodiments, it may not be necessary to control power to every device via the power shedding circuit 144. Here, for example, accessory power strip 180 is not directly controlled by the circuit 144.

A predetermined limit for current drawn from the outlet 112 may be stored in circuit 144 and may vary depending upon the needs of the end user. The predefined limit may be set, for example, according the maximum allowable current that may be drawn from the outlet 112 before an external breaker is thrown. If the current drawn from outlet 112 is below the predefined limit, the circuit 144 may successively power on the second power supply 157 and computer storage modules 160, providing that total current remains below the predefined limit. The order in which devices (e.g. the computer storage modules 160 and the second power supply 157) are powered on may be a predetermined order, which may be stored in the circuit 144, and may vary according to the needs of the user.

If the current drawn exceeds the predefined limit, the most recently powered-on device may be powered off. If the current remains above the predefined limit, other devices may also be powered off according to a predefined order stored in the circuit 144. The current, or an estimate of the current, at each time a device was powered off may be recorded by the circuit 144. A powered-off device may be powered back on when the total current being drawn has fallen (e.g. because of stored computers 200 being removed, or batteries 202 being removed or reaching full charge) such that the powered off device can be powered on without causing the total current drawn from the outlet 112 to go over the predefined limit.

Figure 11:
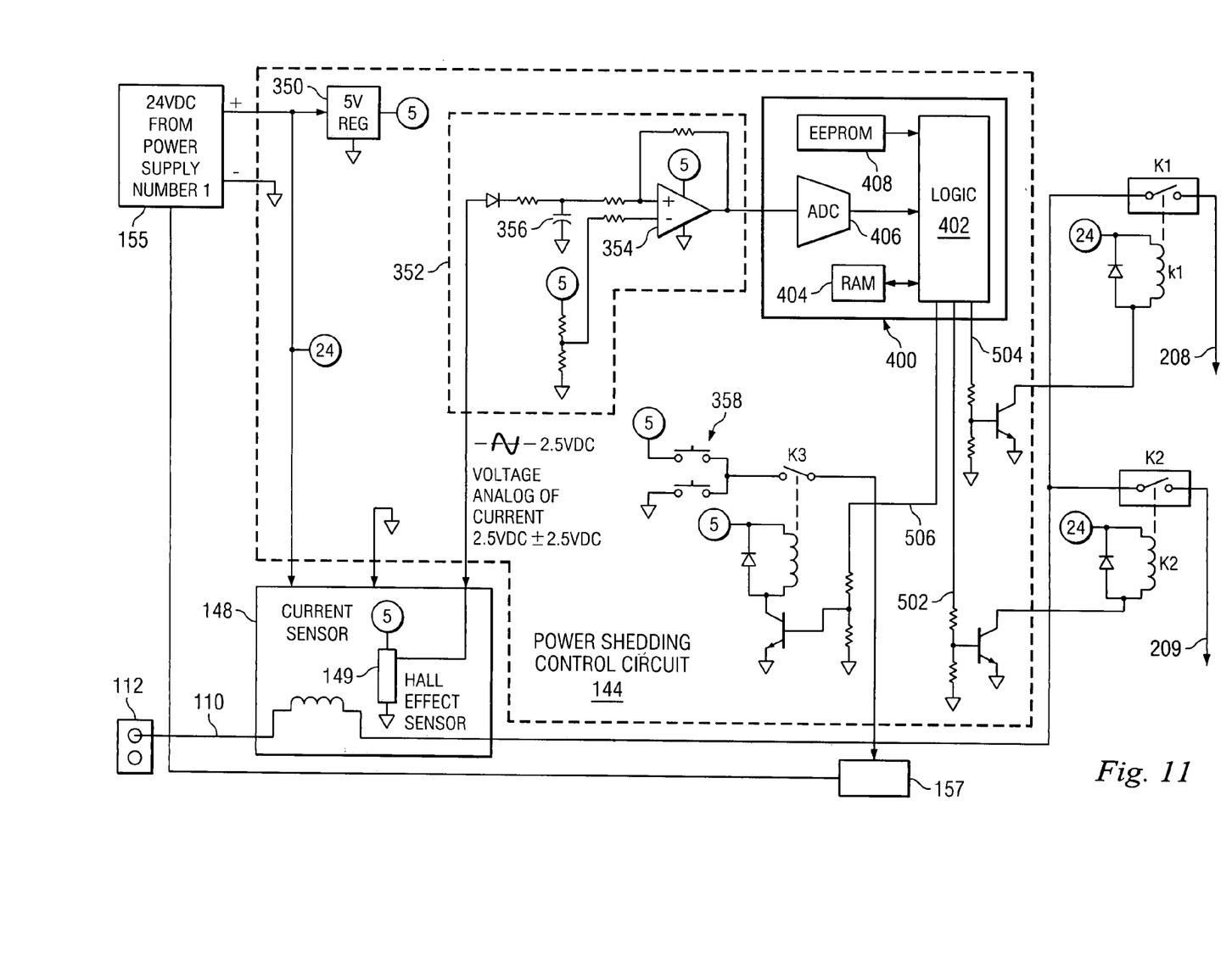
FIG. 11 is a power shedding circuit diagram corresponding to one embodiment of the present disclosure.

For purposes of further illustration, FIG. 11 is a circuit diagram for a possible embodiment of the power shedding circuit 144. The power supply 155 may supply a DC voltage to power the circuit 144. A 5-volt regulator 350 may be used to power the internal circuitry but other voltage levels or regulators may also be used. The circuit 144 is adapted to receive a signal voltage from a current sensing device 148. In one embodiment, the current sensing device 148 comprises a Hall-effect sensor 149, which may provide a signal voltage corresponding to the current being drawn. In other embodiments, other kinds of sensors capable of providing a readable signal voltage may be used.

The circuit 144 may pass the signal voltage from the current sensor 148 through signal conditioning circuitry 352. The signal conditioning circuitry 352 may comprise, for example, a noise reducing capacitor 356. The signal conditioning circuitry 352 may also comprise an operational amplifier 354 which may be configured to amplify the voltage signal before it is processed further. In other embodiments, the signal conditioning circuitry 352 may be configured differently, or may not be needed at all.

A microprocessor 400 may be used to determine when the current is over the predefined limit and to power devices on and off. The microprocessor 400 may have an analog-to-digital converter 406, which receives the conditioned analog voltage signal and coverts it to a digital signal. The digital voltage signal may be passed along to an Arithmetic and Logic Unit (ALU) 402. The ALU 402 may compare the voltage against a value stored in EEPROM 408 corresponding to the predefined current limit. The ALU may execute predefined instructions to determine which outputs 502, 504, 506 to activate, or deactivate, depending upon the current being drawn and which devices have been powered on or off.

In one embodiment, logical outputs 502, 504 are configured to activate the devices (e.g. computer storage modules 160) via relays K2 and K1 respectively. In other embodiments, the relays may be configured differently, or not needed at all. In one embodiment, a logical output 506 sends an enable signal to the second power supply 157 via a relay K3. In alternate embodiments, the relay K3 may not be used. In some embodiments, jumpers 358 are used to properly configure the enable signal for the second power supply 157, but in other embodiments, jumpers may not be needed.

This disclosure has been particularly shown and described with reference to particular embodiments thereof. However, it is understood that various changes in form and detail may be made without departing from the spirit and scope of the disclosure. Therefore the claims should be interpreted in a broad manner, consistent with the present disclosure.

What is claimed is:

1. A computer servicing cart comprising:
   an outer cabinet;
   a first battery servicing compartment disposed in the outer cabinet for selectively charging one or more batteries;
   a first computer storage compartment disposed in the outer cabinet and including a first electrical outlet for selectively charging one or more computers;
   a first internal power supply for providing power to the at least the first battery servicing compartment; and
   a power shedding circuit including
      a current sensing device operable to be in electrical communication with an external electrical outlet, the current sending device including means for providing a signal indicative of a current drawn from the external electrical outlet,
      a first relay in electrical communication with the first internal power supply, the first relay including means for selectively connecting the first internal power supply to the first computer storage compartment, and
      a logic circuit in electrical communication with the current sensing device and the first relay, the logic circuit including means for operating the first relay based on a comparison of the current being drawn from the external electrical outlet as indicated by the signal to a predefined limit.

2. The computer servicing cart of claim 1 where the first internal power supply is selectively connectable to the external electrical outlet.

3. The computer servicing cart of claim 1 wherein the first computer storage compartment further includes:
   at least one shelf;
   at least one electrical outlet adjacent to each shelf; and
   at least one compartment adapted to conceal at least one AC/DC adapter for use with a computer.

4. The computer servicing cart of 3 wherein:
   each shelf adjusts vertically;
   each shelf is tilted downward toward a back end at a predetermined angle;
   each shelf has a recessed portion near a front end adapted to facilitate insertion and removal of computers; and
   each shelf has a retainer adapted to guide an adapter cord to the computer.

5. The computer servicing cart of claim 1 wherein the outer cabinet includes a plurality of wheels.

6. The computer servicing cart of claim 1 further comprising a cooling system.

7. The computer servicing cart of claim 1 wherein the first battery servicing compartment further includes a storage system adapted for storing the one or more batteries.

8. The computer servicing cart of claim 7 wherein the first battery servicing compartment is adaptable to store and charge different battery types.

9. The computer servicing cart of claim 1 further comprising:
   a second internal power supply;
   a second computer storage compartment;
   wherein the power shredding circuit further includes
      a second relay in electrical communication with the first internal power supply, the second relay including means for selectively connecting the first internal power supply to the second computer storage compartment; and
   wherein the logic circuit includes:
      means for closing the first and second relays, and activating the second power supply in a predetermined order when the first power supply is activated;
      means for opening the relays and deactivating the second power supply in a predetermined order when the current sensing device indicates the current being drawing from the external electrical outlet in excess of the predefined limit;
      means for recording a relay or power supply and a current drawn by the relay or power supply that cause the current drawn that is over the predefined limit;
      means for monitoring the current drawn from the external electrical outlet such that a deactivated power supply or an opened relay can be activated or closed respectively when the current drawn from the external outlet has fallen enough to allow reactivation or closing without causing current to be drawn that is in excess of the predefined limit; and
      means for deactivating the second power supply and opening the first and second relays when the first power supply is deactivated.

10. A computer servicing cart comprising:
    a first battery servicing module for selectively charging one or more batteries;
    a first computer storage module including at least one electrical outlet for selectively charging one or more computers;
    a first internal power supply for providing power to the at least the first battery servicing module; and
    a power shedding circuit including
       a current sensing device operable to be in electrical communication with an external electrical outlet, the current sending device including means for providing a signal indicative of a current drawn from the external electrical outlet,
       a first relay in electrical communication with the first internal power supply, the first relay including means for selectively connecting the first internal power supply to the first computer storage module, and
       a logic circuit in electrical communication with the current sensing device and the first relay, the logic circuit including means for operating the first relay based on a comparison of the current being drawn from the external electrical outlet as indicated by the signal to a predefined limit.

11. The computer servicing can of claim 10 where the first internal power supply is selectively connectable to the external electrical outlet.

12. The computer servicing cart of claim 10 wherein first computer storage module further includes:
    at least one shelf;
    at least one electrical outlet adjacent to each shelf; and
    at least one compartment adapted to conceal at least one AC/DC adapter for use with a computer.

13. The computer servicing cart of claim 12 wherein:
    at least one shelf adjusts vertically;
    at least one shelf is tilted downward toward a back end at a predetermined angle;
    at least one shelf has a recessed portion near a front end adapted to facilitate insertion and removal of computers.

14. The computer servicing cart of claim 10 wherein the first battery servicing module further includes a storage system adapted to store the one or more batteries.

15. The computer servicing cart of claim 14 wherein the first battery servicing module is adaptable to store and charge different battery types.

16. The computer servicing cart of claim 10 further comprising a wheeled transport module, the transport module including:
   a plurality of wheels attached to a frame;
   wherein the frame is adapted to detachably receive at least the first computer storage module and the first battery serving module.

17. The computer servicing cart of claim 10 further comprising a ventilation system.

18. The computer servicing cart of claim 1 further comprising:
   a second computer storage module;
   a second power supply disposed in the first battery servicing module; and
   wherein the power shredding circuit further includes:
      a second relay electrical communication with the first internal power supply, the second relay including means for selectively connecting the first internal power supply to the second computer storage module; and
   wherein the logic circuit includes:
      means for closing the first and second relays, and activating the second power supply in a predetermined order when the first power supply is activated;
      means for opening the relays and deactivating the second power supply in a predetermined order when the current sensing device indicates the current being drawing from the external electrical outlet in excess of the predefined limit;
      means for recording a relay or power supply and a current drawn by the relay or power supply that caused the current drawn that is over the predefined limit;
      means for monitoring the current drawn from the external outlet such that a deactivated power supply or an opened relay can be activated or closed respectively when the current drawn from the external outlet has fallen enough to allow reactivation or closing without causing current to be drawn that is in excess of the predefined limit; and
      means for deactivating the second power supply and opening the first and second relays when the first power supply is deactivated.

* * * * *